United States Patent [19]
Morishita et al.

[11] 3,914,462
[45] Oct. 21, 1975

[54] METHOD FOR FORMING A RESIST MASK USING A POSITIVE ELECTRON RESIST

[75] Inventors: Hajime Morishita; Saburo Nonogaki, both of Tokyo, Japan

[73] Assignee: Hitachi, Ltd., Japan

[22] Filed: Nov. 19, 1973

[21] Appl. No.: 416,873

Related U.S. Application Data

[62] Division of Ser. No. 259,659, May 5, 1972, abandoned.

[30] Foreign Application Priority Data

June 4, 1971 Japan ................................ 46-38672

[52] U.S. Cl. .................... 427/43; 96/35.1; 96/36.2; 204/159.14; 427/273

[51] Int. Cl.[2] .................... B05D 3/06; C08F 220/14; C08F 220/44

[58] Field of Search .............. 117/8, 93.31, 161 UC; 96/35.1, 36.2; 204/159.14

[56] References Cited

UNITED STATES PATENTS

| | | | |
|---|---|---|---|
| 3,037,955 | 6/1962 | Carman | 260/86.1 N |
| 3,234,303 | 2/1966 | Bild et al. | 260/876 |
| 3,703,402 | 11/1972 | Cole | 117/93.31 |

*Primary Examiner*—John H. Newsome
*Attorney, Agent, or Firm*—Craig & Antonelli

[57] ABSTRACT

Cathode ray-sensitive coating films known as positive type film which consist of a copolymer of methylmethacrylate with a member or comonomer selected from the group consisting of acrylonitrile, methacrylonitrile and maleic anhydride; these films are suitably used as a positive type photoresist, and as a memory medium for a high density memory.

19 Claims, No Drawings

METHOD FOR FORMING A RESIST MASK USING A POSITIVE ELECTRON RESIST

This is a division of application Ser. No. 259,659 filed June 5, 1972 now abandoned.

BACKGROUND OF THE INVENTION

This invention relates to a positive type cathode ray-sensitive coating film most suitable for use as a corrosion-proof coating film such as a photoresist which when a desired portion of the coating film is exposed to a cathode ray, only the portion exposed may be dissolved in a desired solvent.

It is well known, heretofore, that when a desired portion of a cathode ray-sensitive coating film formed on a substrate is irradiated by a cathode ray in a predetermined irradiation amount, only the portion of the film thus exposed is changed to the material soluble in a desired solvent. Generally, the coating film having such characteristic is called a "positive-type" cathode ray-sensitive coating film.

These positive type cathode ray-sensitive coating films can be utilized as, for example, a photoresist material for fabricating masks being used for etching remarkably minute portions of a semiconductor material in a manufacturing of semiconductor devices, and a memory medium for memorizing informations carried by cathode ray.

Polymethylmethacrylate is well known as a typical material for forming positive type cathode ray-sensitive coating film. The polymethylmethacrylate exhibits a solubility in a solvent, such as methylisobutylketone, after being irradiated by a cathode ray in an irradiation amount of more than $5 \times 10^{-3}$ coulomb/cm$^2$.

The well known positive type cathode ray-sensitive coating films, such as polymethylmethacrylate, as described above, however, have such defects that for providing solubility thereto, a relatively high amount of irradiation of the cathode ray is necessary, that is, the sensitivity thereof is low, and thus for obtaining desired positive type cathode ray irradiation images therein, a relatively long period of time for the cathode ray irradiation should be needed.

SUMMARY OF THE INVENTION

An object of the present invention is to provide a positive type cathode ray-sensitive coating film having a high sensitivity against the cathode ray.

Namely, the improved positive type cathode ray-sensitive coating film of the present invention is characterized in that even when it is irradiated by a cathode ray at a lower irradiation amount as compared with that for the known conventional coating film, it is changed to the material soluble in a desired solvent.

Further, other objects will be understood from the following detailed explanation.

A positive type cathode ray-sensitive coating film of the present invention consists essentially of a copolymer of methylmethacrylate with a comonomer selected from the group consisting of acrylonitrile, methacrylonitrile and maleic anhydride.

A coating film of this invention, consisting of the copolymer described above can obtain therein fine cathode ray images of the positive type in about 1/10 the amount of irradiation to the cathode ray of that required for conventional positive type cathode ray-sensitive coating films.

The copolymer composing the coating film of the present invention can easily be obtained by following a conventional well known method.

Namely, the copolymer is obtained by a method including the step of mixing methylmethacrylate and a comonomer or member selected from the group consisting of acrylonitrile, methacrylonitrile and maleic anhydride in a suitable ratio and the step of copolymerizing the monomeric mixture. The sensitivity of the copolymer against cathode ray tends to become high, according to an increase of a mole ratio of the comonomer. However, when the mole ratio of the comonomer becomes over 50 mole percent, the sensitivity of the copolymer begins to decrease. The copolymer having such a high mole ratio has the disadvantage that even when the copolymer is irradiated by a cathode ray in a large amount of irradiation, the irradiated copolymer can not be subsequently removed by a solvent since a solvent for removing the irradiated copolymer is not yet known.

It is preferable that the mole ratio of the comonomer is from about 0.5 to about 10 mole percent, for obtaining a copolymer having high cathode ray sensitivity.

DESCRIPTION OF THE PREFERRED EMBODIMENTS

The present invention is described in greater detail in the following examples.

EXAMPLE 1

This example relates to a preparation of methylmethacrylate-acrylonitrile copolymer, i.e. the copolymer obtained when the comonomer is acrylonitrile.

This copolymer is obtained by the steps of maintaining water (passed through ion-exchange resin) in a reaction vessel; dissolving an emulsifying agent comprising sodium lauryl sulfate in the water; controlling the atmosphere in the reaction vessel to provide an oxygen-free atmosphere, such as by using a nitrogen atmosphere; introducing a mixture of acrylonitrile and methylmethacrylate whose mole ratio is controlled into the water, adding small amounts of potassium persulfate and sodium bisulfate into the water, and maintaining the reaction vessel at about 45°C. for about 4 hours with stirring of the contents.

Methylmethacrylate-acrylonitrile copolymers having a mole ratio of acrylonitrile of 0.5 mole percent, 5 mole percent, 10 mole percent, 50 mole percent and 70 mole percent, respectively, are obtained by controlling the ratio of quantities of methylmethacrylate and acrylonitrile. In these runs the amount of water used is eight times the total amount of monomers charged to the vessel wherein the amount of sodium lauryl sulfate, potassium persulfate, and sodium bisulfate, respectively is 0.8 times the total monomer charge.

A coating film of the methylmethacrylate-acrylonitrile copolymer having a thickness of about 0.5 micron is formed on a chrome film coated on a glass substrate by the steps of dissolving the copolymer in methyl cellosolve acetate, applying the dissolved copolymer on the chrome film, and drying the applied copolymer.

Table 1 shows irradiation amounts of cathode ray and developers for obtaining positive type fine cathode ray images on respective coating films of the copolymers described in Example 1. In order to develop the coating film it is immersed in developer solvent for 2 minutes and the developer solvent used is then blown against immersed coating film by a spray gun for 30 seconds.

Table 1

| Mole ratio of acrylonitrile (mole percent) | Amount of Irradiation by cathode ray (coulomb/cm$^2$) | Developer Solvent (parts by volume) |
|---|---|---|
| 0.5 | $1 \times 10^{-5}$ | methylisobutylketone + isopropyl alcohol (2:3) |
| 5 | $5 \times 10^{-6}$ | methylisobutylketone |
| 10 | $5 \times 10^{-6}$ | methylisobutylketone + isopropyl alcohol (2:3) |
| 40 | $1 \times 10^{-5}$ | methylisobutylketone + isopropyl alcohol (1:1) |
| 50 | — | — |
| 70 | — | — |
| 0 (polymethylmethacrylate) | $5 \times 10^{-5}$ | methylisobutylketone + isopropyl alcohol (2:3) |

As apparent from Table 1, a cathode ray-sensitive coating film of a methylmethacrylate-acrylonitrile copolymer of the present invention has the characteristic that positive type fine cathode ray images can be obtained, when the mole ratio of acrylonitrile is 0.5 percent, by about ½ the amount of irradiation to the cathode ray as compared with that of conventional polymethylmethacrylate, and, when the mole ratio of acrylonitrile is 5 – 10 percent, by about 1/10 the irradiation amount of cathode ray as compared with that of conventional polymethylmethacrylate. All images obtained in accordance with this invention are similar in clarity, and irradiation values given are the minimum values required to provide soluble film.

However, when the mole ratio of acrylonitrile of the copolymer of the present invention is over 50 percent, positive type fine cathode ray images can not be obtained, since there is no known solvent for dissolving the irradiated parts of the resultant copolymer.

EXAMPLE 2

A copolymer consisting of 80 mole percent of methylmethacrylate and 20 mole percent of methacrylonitrile is made by a method similar to that described in Example 1. In this Example, methacrylonitrile is thus used instead of acrylonitrile as the comonomer.

A coating film of 80 mole percent of methylmethacrylate - 20 mole percent of methacrylonitrile copolymer having about 0.5 micron in thickness is formed by the same steps as described in Example 1.

A part of the coating film is irradiated by a cathode ray in an irradiation amount of more than or equal to $4 \times 10^{-6}$ coulomb/cm$^2$, and then the coating film is immersed in methylisobutylketone for 2 minutes. Further, methylisobutylketone is blown against the immersed coating film by a spray gun for 30 seconds.

As a result of the above steps, the irradiated part of the coating film is removed. However, when a part of the coating film is irradiated in an irradiation amount of less than $4 \times 10^{-6}$ coulomb/cm$^2$, the irradiated part of the coating film can not be removed by the steps as described above.

EXAMPLE 3

A copolymer consisting of 99 mole percent of methylmethacrylate and 1 mole percent of maleic anhydride is obtained by reaction in a sealed tube under the presence of benzoyl peroxide as a catalyst.

A coating film of 99 mole percent of methylmethacrylate - 1 mole percent of maleic anhydride copolymer having about 0.5 micron in thickness is formed by the same steps as described in Example 1.

A part of the coating film is irradiated by a cathode ray in an irradiation amount of more than or equal to $1.0 \times 10^{-5}$ coulomb/cm$^2$, and then the coating film is immersed in a solvent consisting of 2 parts of methylisobutylketone and 3 parts of isopropyl alcohol by volume. Consequently, the irradiated part of the coating film is completely removed.

As described above, positive type cathode ray-sensitive coating films according to the present invention have about 2 to about 10 times the sensitivity as compared with that of the well known conventional polymethylmethacrylate. It will be appreciated that this sensitivity as indicated above is measured by the amount of irradiation required to obtain the desired image. Accordingly, the coating films of this invention are vastly superior to the conventional polymethylmethacrylate film. Such films may have a thickness in the range of from about 0.5 micron to not more than about 1 micron; generally the thickness is less than about 1 micron.

Generally, it is said that the positive type photoresist is superior to the negative type photoresist for obtaining images including a minute part whose size is less than 1 micron therein. Therefore, the present invention is effective in use as a photoresist for obtaining images including minute parts.

What is claimed is:

1. A method for forming a resist mask comprising:

a. providing a substrate;

b. coating said substrate with a thin cathode ray-sensitive film consisting essentially of a copolymer of 60 to 99.5 mole percent of methylmethacrylate and 0.5 to 40 mole percent of a comonomer selected from the group consisting of acrylonitrile, methacrylonitrile and maleic anhydride;

c. exposing at least a portion of said cathode ray-sensitive film to a cathode ray of an irradiation amount of at least $5 \times 10^{-6}$ coulomb/cm$^2$ in a predetermined pattern leaving at least one unexposed region; and d. removing said exposed portion of said cathode ray-sensitive film by dissolving in a solvent in which the unexposed region is insoluble thereby forming a resist mask having the predetermined pattern.

2. The method for forming a resist mask according to claim 1, in which the copolymer consists of 90 to 95 mole percent of methylmethacrylate and 5 to 10 mole percent of the comonomer.

3. The method for forming a resist mask according to claim 2, in which the comonomer is acrylonitrile.

4. The method for forming a resist mask according to claim 1, in which the comonomer is methacrylonitrile.

5. The method for forming a resist mask according to claim 1, in which the comonomer is maleic anhydride.

6. The method for forming a resist mask according to claim 1, in which the comonomer is acrylonitrile.

7. The method for forming a resist mask according to claim 1, in which said film has a thickness of about 0.5 micron.

8. The method for forming a resist mask according to claim 1, in which said solvent is methylisobutylketone, isopropyl alcohol, or mixtures thereof.

9. The method for forming a resist mask according to claim 8, wherein said solvent comprises a mixture of methylisobutylketone and isopropyl alcohol wherein the proportion of methylisobutylketone to isopropyl alcohol is no more than about 2 : 3.

10. The method for forming a resist mask according to claim 1, wherein said exposed portion is dissolved in said solvent by immersing said film in said solvent, by removing from said solvent, and thereafter by spraying said solvent on said film.

11. The method for forming a resist mask according to claim 10, wherein said film is immersed in said solvent for about two minutes and thereafter said solvent is sprayed on said film for about 30 seconds.

12. The method for forming a resist mask according to claim 1, wherein the irradiation amount of said cathode ray is no more than about $1 \times 10^{-5}$ coulomb/cm$^2$.

13. The method for forming a resist mask according to claim 11, in which the irradiation amount of said cathode ray is no more than about about $1 \times 10^{-5}$ coulomb/cm$^2$.

14. A method for forming a cathode ray image comprising:

a. providing a substrate;

b. coating said substrate with a cathode ray-sensitive film consisting essentially of a copolymer of 60 to 99.5 mole percent of methylmethacrylate and 0.5 to 40 mole percent of a comonomer selected from the group consisting of acrylonitrile, methacrylonitrile and maleic anhydride;

c. exposing at least a portion of said cathode ray-sensitive film to cathode ray beam; and d. removing said exposed portion of said cathod ray-sensitive film by dissolving in a solvent, whereby the cathode ray image is formed on the substrate.

15. The method for forming a cathode ray image according to claim 14, in which the copolymer consists of 90 to 95 mole percent of methylmethacrylate and 5 to 10 mole percent of the comonomer.

16. The method for forming a cathode ray image according to claim 15, in which the comonomer is acrylonitrile.

17. The method for forming a cathode ray image according to claim 14, in which the comonomer is methacrylonitrile.

18. The method for forming a cathode ray image according to claim 14, in which the comonomer is maleic anhydride.

19. The method for forming a cathode ray image according to claim 14, in which the comonomer is acrylonitrile.

* * * * *